United States Patent [19]

Biggs

[11] Patent Number: 4,750,215

[45] Date of Patent: Jun. 7, 1988

[54] POLICE RADAR SIGNAL DETECTION CIRCUITRY FOR A POLICE RADAR WARNING RECEIVER

[75] Inventor: Michael A. Biggs, Mason, Ohio

[73] Assignee: Cincinnati Microwave, Inc., Cincinnati, Ohio

[21] Appl. No.: 878,055

[22] Filed: Jun. 24, 1986

[51] Int. Cl.$^4$ .................... H04B 17/00; H04B 1/26
[52] U.S. Cl. .................... 455/226; 455/315; 342/20
[58] Field of Search ................ 455/226, 228, 166, 35, 455/167, 207, 208, 209, 214, 313, 314, 315, 316; 324/77 CS, 77 C; 342/98, 100, 20, 193

[56] References Cited

U.S. PATENT DOCUMENTS

| | | |
|---|---|---|
| 2,779,869 | 1/1957 | Gerks . |
| 2,804,160 | 8/1957 | Rashid . |
| 3,257,659 | 6/1966 | Siegel . |
| 3,448,822 | 6/1969 | Lone et al. . |
| 3,500,211 | 3/1970 | Clarke . |
| 3,602,821 | 8/1971 | Juroff . |
| 3,623,075 | 11/1971 | Bench et al. . |
| 3,688,197 | 8/1972 | Kahn . |
| 3,728,624 | 4/1973 | Salle et al. . |
| 3,757,329 | 9/1973 | Sato et al. . |
| 3,795,169 | 3/1974 | Belcher . |
| 3,808,528 | 4/1974 | Nugent et al. . |
| 3,828,258 | 8/1974 | Hills et al. . |
| 3,895,293 | 7/1975 | Munz . |
| 3,953,794 | 4/1976 | Moore . |
| 3,958,133 | 5/1976 | Albano et al. . |
| 3,987,422 | 10/1976 | Yanagidaira et al. . |
| 3,997,847 | 12/1976 | Tong . |
| 4,025,920 | 5/1977 | Reitboeck et al. . |
| 4,038,656 | 7/1977 | Webb, Jr. et al. . |
| 4,050,747 | 9/1977 | Ruhnau et al. . |
| 4,059,806 | 11/1977 | Vagt, Jr. . |
| 4,085,367 | 4/1978 | Williams et al. . |
| 4,115,738 | 9/1978 | Mitarai et al. . |
| 4,124,819 | 11/1978 | Hansen . |
| 4,131,890 | 12/1978 | Outram . |
| 4,150,375 | 4/1979 | Ross et al. . |
| 4,158,190 | 6/1979 | Stefanov . |
| 4,166,980 | 9/1979 | Apostolos et al. . |
| 4,178,631 | 12/1979 | Nelson, Jr. . |
| 4,179,625 | 12/1979 | Carter . |
| 4,188,628 | 2/1980 | Langeraar et al. . |
| 4,194,206 | 3/1980 | Tsui et al. . |
| 4,215,280 | 7/1980 | Mahig . |
| 4,228,395 | 10/1980 | Dusheck, Jr. et al. . |
| 4,246,497 | 1/1981 | Lawson et al. . |
| 4,302,817 | 11/1981 | Labedz . |
| 4,305,159 | 12/1981 | Stromswold et al. . |
| 4,313,216 | 1/1982 | Jaeger et al. ............... 455/226 |
| 4,339,723 | 7/1982 | Yee . |
| 4,353,032 | 10/1982 | Taylor . |
| 4,403,220 | 9/1983 | Donovan . |
| 4,438,407 | 3/1984 | Kemmesies . |
| 4,468,796 | 8/1984 | Suga . |
| 4,479,125 | 10/1984 | Mori . |
| 4,486,752 | 12/1984 | Chihak . |
| 4,495,642 | 1/1985 | Zellmer . |
| 4,504,786 | 3/1985 | Slaughter . |
| 4,527,160 | 7/1985 | Endo et al. . |
| 4,547,727 | 10/1985 | Tsui et al. . |
| 4,581,769 | 4/1986 | Grimsley et al. ............... 455/226 |
| 4,587,522 | 5/1986 | Warren ............... 455/35 |
| 4,626,857 | 12/1986 | Imazeki ............... 455/166 |

FOREIGN PATENT DOCUMENTS

658161 2/1963 Canada .

Primary Examiner—Robert L. Griffin
Assistant Examiner—Curtis Kuntz
Attorney, Agent, or Firm—Wood, Herron & Evans

[57] ABSTRACT

A radar warning receiver is provided having a police radar signal detection circuit which generates evaluation signals, the state of which indicates the voltage level relative a threshold voltage of a discriminator output as the local oscillator is swept through the radar band. The times during which the evaluation signals are in one state or the other are utilized to identify whether the received signal is from a fixed frequency (e.g., police radar) source or a variable frequency source (e.g., spurious signals).

41 Claims, 3 Drawing Sheets

POLICE RADAR SIGNAL DETECTION CIRCUITRY FOR A POLICE RADAR WARNING RECEIVER

BACKGROUND OF THE INVENTION

I. Field of the Invention

The present invention is directed to an improvement in vehicle-mounted police radar warning receivers, and more particularly to such a receiver which can distinguish between pulsed or continuous signals from a fixed frequency source (e.g., police radar) and such signals from a variable frequency source (e.g., non-police radar).

II. Description of the Prior Art

Police radar operates in the X-band and K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. While transmitting, both continuous and pulsed radar transmit a signal which is at a fixed frequency within the selected band.

An electronic assembly referred to as a police radar warning receiver has been devised to detect the presence of police radar signals. The receiver is mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar. The receiver is contained in a box-like housing which is set on the dash or clipped to the visor in the vehicle. Extending from the rear of the housing is a power cord which terminates in a plug adapted to be received in the cigarette lighter socket of the vehicle. The front panel of the receiver faces the driver and has various indicators and control knobs.

When police radar is operating within range of the radar warning receiver, the circuitry of the receiver is able to detect the presence thereof. The ESCORT and PASSPORT radar warning receivers, manufactured by the assignee herein, Cincinnati Microwave, Inc. of Cincinnati, Ohio, utilize a superheterodyne circuit for this purpose. As explained in aforementioned U.S. Pat. Nos. 4,313,216, and in U.S. Pat. No. 4,581,769, which is also assigned to the assignee herein, a superheterodyne circuit employs two local oscillators, one of which sweeps in frequency over a range of frequencies related to one or both radar bands. A first oscillator signal is mixed with the incoming police radar or other signal to produce a first IF signal. The first IF signal is then mixed with the other oscillator signal to produce a second IF signal which is then passed through a discriminator circuit to provide output pulses if a signal is present. As is understood, such a heterodyning process will result in generation of a "duplicate" or image of the police radar signal within the receiver. Hence, the discriminator generates a pulse related to the actual frequency signal received as well as a subsequent pulse related to the image frequency of the received signal.

One advantage of a superheterodyne circuit is that neither oscillator need operate at a frequency within the range of actual radar frequencies. Thus, filters can be used in the antenna to reduce leakage out of the receiver of energy generated by the oscillators without also filtering out the received radar signal. Further, any oscillator energy which might leak out of the receiver will not appear as a police radar signal to another radar warning receiver as it will be outside the range of frequencies of interest to that other receiver.

Some radar warning receivers have been introduced to the marketplace using the so-called superhomodyne scheme for detecting frequencies in the X- and K-bands. These receivers use a signal generator or local oscillator operated at or near the same frequency as the signal to be received, and this internal signal tends to be re-emitted by the antenna of the receiver. Although its power level is low, the proximity of a receiver of this type to a sensitive receiver could make it appear that a police radar transmitter is in the vicinity, thus sounding an alarm. Since the local oscillator in a superhomodyne receiver is at or near the same frequency as the received signal, it is impossible to trap that signal and thus prevent it from being re-radiated by the antenna without also interfering with reception of police radar signals.

As a result, receivers of the superhomodyne type are continuously broadcasting X- and K-band signals which must be discriminated against by other receivers so as not to erroneously indicate presence of a police radar signal. As discussed in aforementioned U.S. Pat. No. 4,581,769, the signals emitted from superhomodyne receivers have one characteristic, however, that permits their signals to be distinguished from police radar signals, and that is the frequency of the superhomodyne emitted signal is constantly varying over the range of frequencies that it is designed to detect and thus, when discriminated, will generate what appear to be random pulses from sweep to sweep. Taking advantage of that characteristic, the circuitry disclosed in the afore-mentioned U.S. Pat. No. 4,581,769 utilizes a "pulse position" technique which relies upon the time relative position of each pulse generated by the discriminator in each sweep of the local oscillator. For a fixed frequency signal, e.g., police radar, the primary and image pulses will be generated at the same time in the sweep from sweep to sweep. The pulses resulting from a spurious homodyne receiver signal will appear to move from sweep to sweep. Hence, unless the pulses are in the same location during consecutive sweeps, the receiver can ignore the incoming signal as it is not likely a police radar signal. Relying upon the apparent time compression affect of receiving such a spurious signal which causes the discriminator output to appear to contain high frequency components, other receivers merely low pass filter the discriminator output pulses thereby preventing them from reaching alarm enabling circuitry.

Various other electronic products designed to operate in the radar bands have been proposed for use with automobiles and the like. Recently, for example, a radar-based system has appeared which may be utilized to reduce the likelihood of collisions. One such system transmits a radar signal in the X-band from one vehicle and receives reflections thereof from a second vehicle to control the braking system of the first vehicle or to warn the driver thereof that one vehicle is approaching the other at too great a speed. This collision system operates in the X-band. Hence, the signal generated thereby appears to a radar warning receiver to be a police radar signal. An alarm would, therefore, be generated. Indeed, neither the "pulse position" nor the low pass filter techniques discussed above are believed capable of discriminating against this new spurious signal so as not to unnecessarily generate an alarm.

The "pulse position" technique is not believed to work because the signal emitted by the collision system does not vary across the band as do spurious homodyne receiver signals. Rather, the collision system emits a signal which is in the nature of a frequency-shift-keyed (FSK) signal. The FSK signal is centered at about 24 GHz with a 400 KHz separation. That is, the signal emitted by the collision system will toggle back and forth between 23.9998 GHz and 24.0002 GHz. Because the separation is so close, the signal as received by the radar warning receiver would appear as though it were essentially at 24 GHz, i.e., from a fixed frequency source. Even were the radar warning receiver sensitive enough to receive and discriminate both the lower and higher frequency signals as two separate signals, the toggle rate of the collision system is so fast (about 16.4 KHz) that the radar warning receiver would detect what would appear as two signals at the respective fixed frequencies during each sweep. Hence, with the "pulse position" technique, there would merely be more repeated pulses in the same location from sweep to sweep and the receiver would still generate an alarm indicating reception of a police radar signal.

Similarly, the low pass filter technique is not believed to be a workable solution, either. When a radar signal is received, the output of the discriminator has a characteristic S curve with a fundamental frequency related to the sweep rate of the local oscillator and the bandwidth of the discriminator. Receipt of a spurious homodyne receiver signal causes the discriminator output to "time-compress", i.e., the S curve will appear as though the sweep rate of the local oscillator had increased. As a result, the discriminator output will have an effective fundamental frequency much greater than the fundamental frequency as in the case of the received radar signal. Thus, a low pass filter with a cutoff above the fundamental frequency (radar signal) and below the apparent fundamental frequency (spurious homodyne receiver signal) will effectively filter out the spurious homodyne receiver signal. However, the collision system signal will generate an S curve output from the discriminator with essentially the same fundamental frequency as that generated by receipt of a radar signal but with added frequency components due to the 16 KHz toggle rate. Use of a low pass filter to eliminate such a signal would also interfere with proper operation of the police radar warning receiver. That is, the cut-off frequency of the filter would have to be so low that it would preclude proper detection of true police radar signals as well.

SUMMARY OF THE INVENTION

The present invention provides circuitry for a radar warning receiver which can discriminate against high frequency modulated signals in the band of the radar warning receiver such as are emitted by collision radar systems. Characteristically, discriminator output pulses have one portion above a threshold or reference voltage (up phase) and a second portion below the threshold (down phase) with at least one threshold crossing therebetween. I have determined that reception of a police radar signal (i.e., a signal from a fixed frequency source) will result in an up phase and a down phase, each of which will occur for at least a predetermined time and which will be separated by essentially only one threshold crossing. I have further determined that reception of a spurious signal such as from the collision system will result in one or the other of the up or down phases being separated by more than one threshold crossing. To this end, the present invention provides circuitry which (i) generates evaluation signals, the state of which indicates the voltage level relative to a threshold of the discriminator output as the local oscillator is swept through the radar band; and (ii) evaluates the length of time the evaluation signal is in either of the two states. Only in response to a signal from a fixed frequency source or a slowly varying frequency source (e.g., homodyne receivers), will the evaluation signals be in first state throughout a first predetermined time and in the second state throughout a second predetermined time, the second predetermined time beginning a third predetermined time after the first predetermined time ends. Any fast varying signal, such as emitted by the collision system, will result in the evaluation signal being in the wrong state for some period of time during one of the first or second predetermined times.

As mentioned, the discriminator will generate two pulses as a consequence of reception of a fixed frequency signal such as a police radar signal. The first pulse, the so-called primary signal, is characterized in that, as the oscillator sweeps, the up phase is produced first followed by the down phase. The so-called image signal is characterized in that the down phase is produced first followed by the up phase. For a police radar signal, the primary signal always occurs before the image signal during a sweep of the oscillator. Thus, for reception of a police radar signal, there will be generated a pair of evaluation signals having the characteristic of a primary signal followed by an image signal during one sweep of the local oscillator. In accordance with the foregoing, a primary signal is defined as an evaluation signal which is in the first state for the first predetermined period of time and is in the second state for the second predetermined period of time. An image signal is defined as the opposite of a primary signal, i.e., the evaluation signal is in the second state for the first predetermined period of time and in the first state for the second predetermined period of time. According to the present invention, discrimination between a police radar signal and a spurious collision signal, which will also generate a primary signal and an image signal, can be done with either one of the pair of evaluation signals.

The present invention was originally intended to augment the pulse position and/or low pass techniques to cooperatively detect police radar signals as against both spurious homodyne receiver signals and high frequency modulated signals in the radar bands. Surprisingly, however, I have also discovered that another aspect of the present invention may be utilized to discriminate against spurious homodyne receiver signals.

I have determined that spurious homodyne receiver signals will generate at least one pair of evaluation signals which will have the inverse characteristic of a police radar signal, i.e., the pair will be an image signal followed by a primary signal during one sweep of the local oscillator. Accordingly, one aspect of the present invention may be utilized to discriminate against signals such as the spurious homodyne receiver signals by ignoring received signals which generate an evaluation signal pair which result in generation of an image signal followed by a primary signal.

A yet further aspect of the present invention provides a fail-safe circuit to indicate whether certain aspects of the radar warning receiver are operating properly. Typically, during reception of police radar signals, the image signal will appear within one of two preset ranges of time after the primary signal, depending upon whether the radar signal is in the X-band or K-band. By timing the occurrence of the primary and image signals, therefore, an appropriate alarm can be energized to indicate X-band or K-band. Hence, as a further means of discriminating against unwanted signals, an alarm is sounded only if the received signal is in the X- or K-band. Should some portion of the radar warning receiver begin to fail, e.g., should the frequency of the local oscillator begin to drift, the timing relationship between the primary and the image signals may be other than expected. Under these circumstances, circuitry which generates an alarm only if the received signal is X- or K-band will not work and the driver will not, therefore, be alerted to the possible presence of police radar. With this yet further aspect of the present invention, it is possible to indicate that such failure has occurred and/or to energize an alarm to indicate possible presence of police radar notwithstanding the primary-/image signal time relationship is skewed. To this end, the present invention provides a fail-safe feature which counts the number of consecutive sweeps during which a primary signal is followed by an image signal. If neither an X-band nor a K-band alarm is indicated during one of a preset number of such sweeps, the fail-safe system may be utilized to indicate that the receiver is not operating properly and/or to override the above-mentioned X-and K-band alarm system and generate an alarm anyway.

BRIEF DESCRIPTION OF THE DRAWINGS

The several objectives, advantages and features of the present invention will become more readily apparent from the following detailed description taken with the accompanying drawings wherein like reference numerals apply to like structure and in which.

DETAILED DESCRIPTION OF THE DRAWINGS

Figure 1:
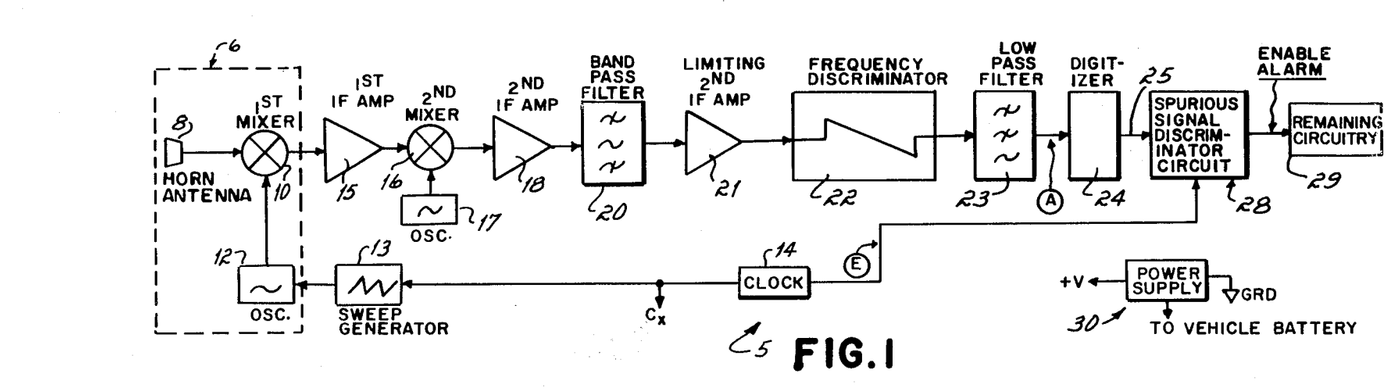
FIG. 1 is a block diagram of a radar warning receiver according to the principles of the present invention.

With reference to FIG. 1, there is shown a block diagram of a radar warning receiver 5 according to the principles of the present invention. Pulsed or continuous signals occurring in the X-band or K-band are received by an antenna system 6 which includes horn antenna 8 coupled to first mixer 10 to which the signals received by horn antenna 8 are directed. Horn antenna 8 may include filters for preventing signals at unwanted frequencies from being passed to first mixer 10, and it may further include other filters for preventing outward radiation therefrom of internally generated radio frequency signals. Coupled to first mixer 10 is a variable frequency first local oscillator 12 adapted to be swept in frequency over a range of frequencies as described in aforementioned U.S. Pat. No. 4,313,216, the disclosure of which is incorporated herein by reference. First mixer 10 and first local oscillator 12 may be built into and made a part of antenna system 6 as described in Fende et al, U.S. patent application, Ser. No. 656,026, filed Sept. 28, 1984, entitled POLICE RADAR WARNING RECEIVER, and assigned to the assignee herein. The disclosure of said application Ser. No. 656,026 is incorporated herein by reference. The oscillator disclosed in U.S. Pat. No. 4,583,057, also assigned to the assignee herein, may be utilized for local oscillator 12. The disclosure of said U.S. Pat. No. 4,583,057 is incorporated herein by reference.

The frequency of the oscillator signal generated by local oscillator 12 varies, i.e., it is swept, across a predetermined band of frequencies by a sweep generator 13 under control of a system clock 14 to be described hereafter. The varying frequency signal generated by local oscillator 12 is mixed with received signals from horn antenna 8 in first mixer 10 to generate first IF signals which are coupled to first IF amplifier 15. The output of amplifier 15 is coupled to a second mixer 16 whereat the first IF signals are mixed with a fixed frequency oscillator signal from second local oscillator 17 to produce second IF signals which are amplified by second IF amplifier 18. The frequency of oscillator 17 is selected so that during the sweep of oscillator 12, any received signal in the desired bands mixed with the signal from oscillator 12 will generate two IF signals, one having a frequency below the frequency of the signal from oscillator 17 and one having a frequency thereabove (sometimes referred to as low side signal and high side signal). The output of amplifier 18 is coupled through bandpass filter 20 and limiting second IF amplifier 21 to frequency discriminator circuit 22. The output of discriminator 22 is coupled to low pass filter 23 which preferably has a corner frequency of less than 8 KHz and more preferably about 6 KHz. Operation of the foregoing is generally as described in aforesaid U.S. Pat. No. 4,313,216.

Representative output signals from low pass filter 23 are shown in curves A of FIGS. 3 I, 3 II and 3 III for various received signals as will be discussed. Filter 23 output signals will vary in voltage level above and below a predetermined threshold voltage $V_T$. These signals are coupled to digitizer 24 which produces signals referred to herein as evaluation signals on output 25. Digitizer 24 is preferably a symmetrical non-inverting limiter and produces evaluation signals which, at any given time, will preferably be in one of two states. The two states are defined as logic levels "1" and "0" (or high and low, respectively) corresponding to the positive power supply voltage (+V) and ground, respectively. For the evaluation signal to be in the first state (logic "1" or high), the input to digitizer 24 must be above $V_T$. Similarly, the evaluation signal will be in the second state (logic "0" or low) when the input to digitizer 24 is below $V_T$.

The evaluation signals on output 25 are coupled to spurious signal discriminator circuit 28 which, in cooperation with signals from clock 14, is adapted to determine whether the received signal was from a fixed frequency source or a variable frequency source. Only in the former situation will an alarm enable signal be generated to the remaining circuitry 29.

Figure 2:
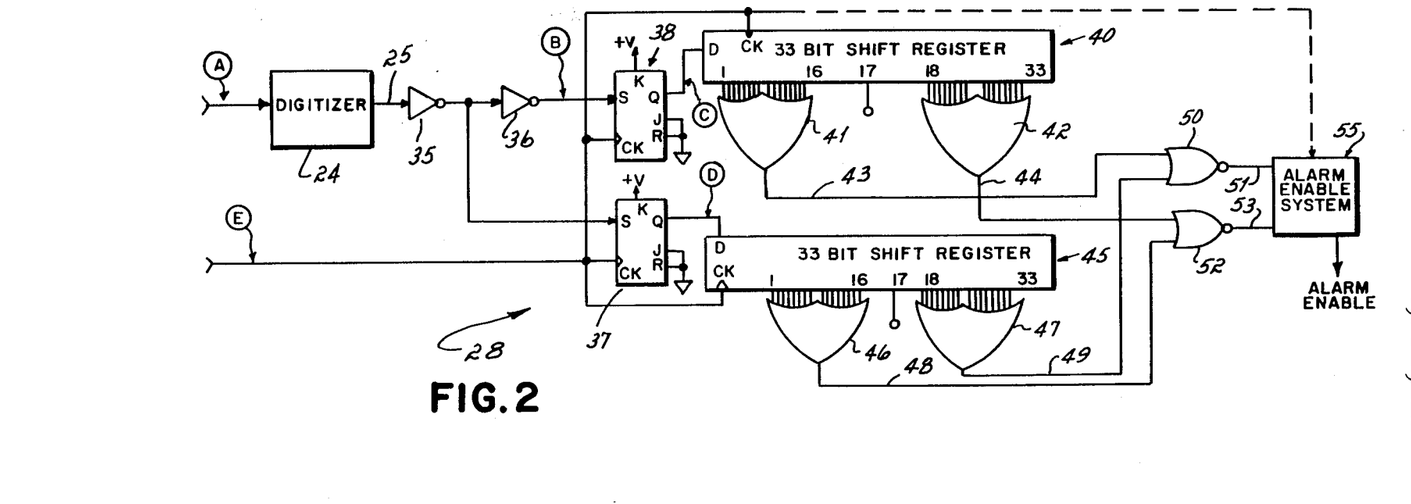
FIG. 2 is a schematic representation of a preferred embodiment of the spurious signal discriminator circuitry of the present invention.

With further reference to FIG. 2, there is shown a schematic representation of a preferred embodiment of spurious signal discriminator circuit 28. Output 25 of digitizer 24 is coupled (i) through a first inverter 35 to a first J-K flip-flop or latch 37 and (ii) through inverter 35 and second inverter 36 to second J-K flip-flop or latch 38. Thus, the output of inverter 35 (S input to latch 37) will be at a logic level opposite that of output 25 while the output of inverter 36 (S input to latch 38) will be at the same logic level as output 25.

The Q output of latch 38 is coupled to the input of a first 33 bit shift register 40, with the first 16 bits or outputs thereof wire-OR'd together (as represented by OR gate 41) and the last 16 bits or outputs thereof similarly wire-OR'd together (as represented by OR gate 42). Output 17 is a "don't care" bit as will be explained.

Similarly, the Q output of latch 37 is coupled to the input of a second 33 bit shift register 45, the outputs of which are similarly OR'd as represented by OR gates 46 and 47, respectively. Output 43 of OR gate 41 and output 49 of OR gate 47 are NOR'd by gate 50 to generate on output 51 a primary signal as will be described hereafter. Similarly, output 44 of OR gate 42 and output 48 of OR gate 46 are NOR'd by gate 52 to generate on output 53 an image signal as will also be described hereafter. Outputs 51 and 53 may be OR'd such that generation of either a primary signal or an image signal will result in generation of an alarm enable signal to drive remaining circuitry 29 (which includes alarm drivers and the like (not shown)). Hence, alarm enable system 55 may simply be an OR gate. Preferably, as will be described in connection with FIG. 4, alarm enable system 55 is under control of a signal from clock 14 and utilizes both outputs 51 and 53 to indicate whether the signal received at horn antenna 8 is in the X-band or the K-band. System 55 may also be utilized to discriminate against spurious homodyne receiver signals and to provide for fail-safe operation all as will be explained. Before turning to FIG. 4, however, operation of the circuit of FIG. 2 will be explained with reference to the waveforms of FIG. 3.

As can be seen in FIG. 2, latches 37 and 38 and registers 40 and 45 are operated under control of a clock signal (waveform E in FIG. 3) from clock 14. Clock signal E is preferably at 65.536 KHz while the clock signal $C_X$ driving sweep generator 13 provides a short pulse at about an 8 Hz rate (i.e., oscillator 12 will sweep through its band eight times every second). Thus, the output of digitizer 24 (the evaluation signals generated during each sweep of oscillator 12) is sampled more than 8,000 times each sweep as is represented by the clock pulses of waveform E of FIG. 3.

Figure 3:
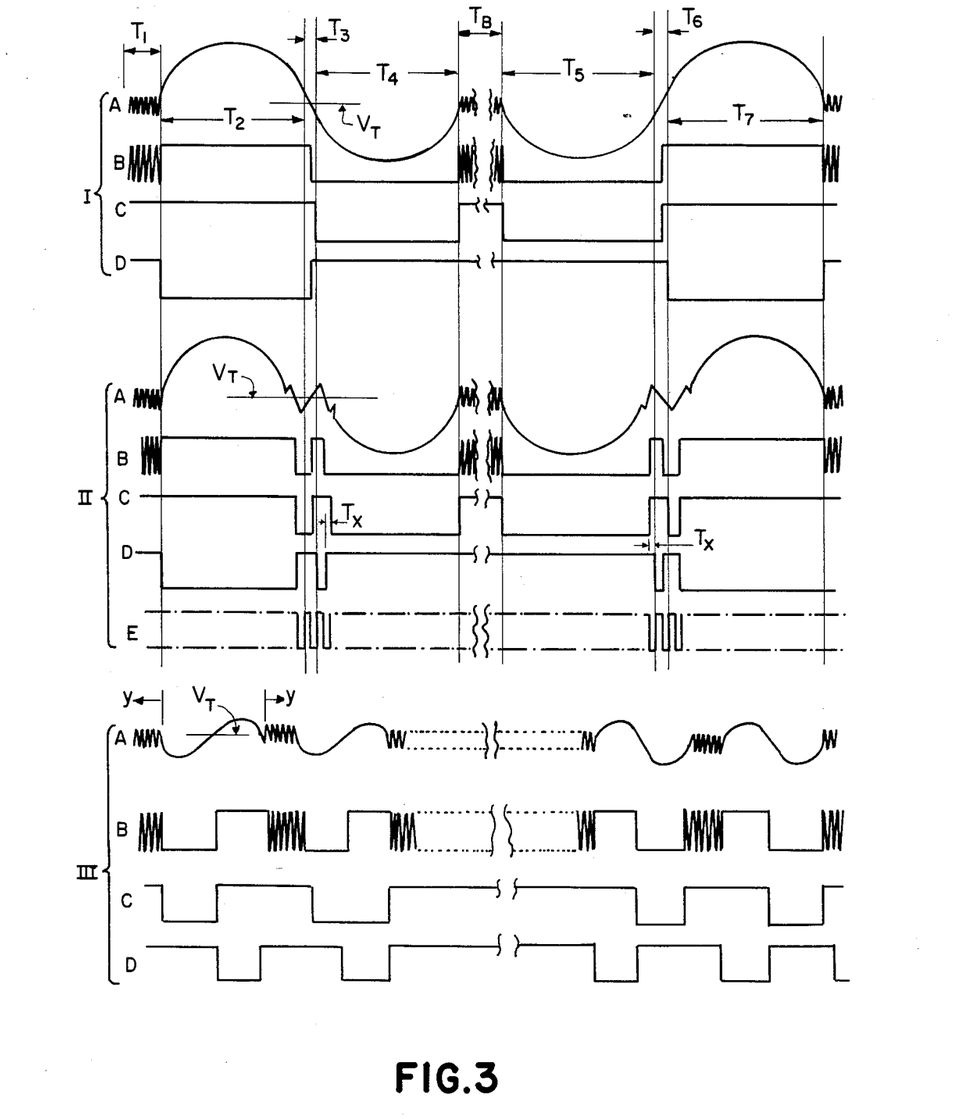
FIG. 3 are waveforms for explaining the principles of operation of the present invention.

With reference to FIG. 3 I, waveform A represents the output of low pass filter 23 when a police radar signal (i.e., a signal from a fixed frequency source) is detected. Although the signal being detected is, for purposes of one sweep of oscillator 12, a CW or continuous wave signal, the action of first local oscillator 12 in sweeping or varying in frequency, and the subsequent mixing of the resulting first IF signal with the second local oscillator signal generates an IF signal which "sweeps past" the center frequency of the discriminator circuit at a rate determined by sweep generator 13.

Therefore, discriminator 22 senses a signal which is continuously changing in frequency. Thus, waveform A of FIG. 3 I illustrates the output of the frequency discriminator after it has been filtered by filter 23 wherein the random noise passing through limiting second IF amplifier 32 is finally blanked when the input signal "captures" the limiter, and until that occurs, the output of the discriminator is a noise signal which varies at a random rate above and below threshold $V_T$.

When the signal captures limiter 21, discriminator 22 output will then vary above and below the threshold voltage $V_T$. In the example shown, the output of the discriminator may first increase above $V_T$ as the output is captured, then decrease to pass through and below $V_T$ as the signal moves through bandpass filter 20, until it reaches the limits of discriminator 22 at which point the discriminator output returns to noise (the primary signal). When the image is detected, the discriminator output first decreases below $V_T$, then increases past and above $V_T$, and then returns to noise (the image signal).

Limiting second IF amplifier 21, frequency discriminator 22 and the bandpass filter 20 form a frequency-to-voltage converter for converting the radio frequency input signals to a voltage which changes at a rate proportional to the rate of change of frequency in the signals. The response bandwidth of this combination of elements is less than the range of frequencies through which the input signal, i.e., the first IF frequency, is varied.

Low pass filter 23 is coupled to the output of the discriminator 22 and reduces the noise component output thereof. However, the discriminator output signals will remain substantially the same, and therefore primary and image signals representing low side and high side detection of the detected signals by second mixer 16 (for K-band; high side and low side detection for X-band) will be substantially larger than the noise level.

The output of filter 23 is digitized as before-mentioned to produce a digital logic compatible signal as shown in waveform B of FIG. 3 I. When latches 37 and 38 are configured as shown in FIG. 2, if the Q input is high, or logic "1", during any portion of a clock cycle, output Q will be latched high for that cycle. Only if the Q input thereof is low throughout the clock cycle will output Q be low. Thus, if during a clock cycle, the input to digitizer 24 includes noise (time $T_1$ in FIG. 3 I), the output Q of latches 37 and 38 would both be high. If the discriminator signal were in its up phase portion (time $T_2$ or $T_7$ in FIG. 3 I), output Q of latch 38 would be high and output Q of latch 37 would be low as shown in waveforms C and D, respectively, of FIG. 3 I. Conversely, if the discriminator output were in its down phase portion, as in time $T_4$ or $T_5$ in FIG. 3 I, latch 38 output would be low and latch 37 output would be high as also shown in said respective waveforms C and D. However, during only one clock cycle between the up phase and down phase portions of the discriminator output, the input to both latches 37 and 38 will be high for some period of time thus producing a high from both latches (see times $T_3$ and $T_6$ of FIG. 3 I).

As will be appreciated, the outputs of latches 37 and 38 indicate the status of the input signal to digitizer 24. That is, if the outputs are investigated at the end of a clock cycle and if both are high, that would indicate noise or a threshold crossing from discriminator 22, whereas if one latch is low, it will be possible to know which portion of the discriminator output is occurring during that clock cycle by which latch is high. I have determined that a signal from a fixed frequency source within the sensitivity of receiver 5 will produce a logic "1" from latch 38 and a logic "0" from latch 37 for at least sixteen clock cycles and the inverse for at least another sixteen clock cycles with but one clock cycle therebetween for a threshold crossing (or more than one if the signal is very weak or noisy, but all within the single clock cycle). Thus, where the signals on output 25 of digitizer 24 are in only a first state throughout a first predetermined time interval and, beginning a second predetermined time interval after the first time interval ends, the signals on output 25 are in only a second state throughout a third predetermined time interval, the received signal may be deemed a police radar signal. To accomplish this time record comparison, registers 40 and 45 are preferably provided. Each output Q of a respective latch 37 and 38 is clocked into a respective register 45 and 40. After thirty-three clock cycles, and throughout the remaining clock cycles of one sweep of oscillator 12, certain coincidences of signals from registers 40 and 45 will indicate whether a police radar signal has been received.

As each sweep progresses, all outputs 43, 44, 48 and 49 will typically be high. As the sweep progresses, output 25 is initially driven by noise from filter 23 (i.e., output 25 is rapidly switching between high and low) during each clock cycle. Hence, until a signal within the passband of receiver 5 is received at horn antenna 8, the inputs to registers 40 and 45 will typically remain high and so, too, will all thirty-three respective outputs. An occasional low is statistically possible, but will not likely occur often enough to cause a change in outputs 43, 44, 48 and 49 which, therefore, will remain high. Consequently, outputs 51 and 53 will remain low. When a police radar signal is received at horn antenna 8, the Q outputs of latches 38 and 37 will be as shown in waveforms C and D as described above. During time $T_2$, all inputs to register 40 will still be high, but the serial inputs to register 45 will be low. Hence, at the end of time $T_2$, output 48 will go low (indicating a hit). However, output 44 will still be high (so, too, will outputs 43 and 49) precluding generation of an alarm enable signal by system 55. One clock cycle later ($T_3$), bit 1 of register 40 will again be high due to the threshold crossing which occurred therein. For the same reasons, bit 1 of register 45 will go high. During time $T_4$, output 25 will be low (because the output of filter 23 is in the down phase portion). Hence, sixteen clock cycles after the end of time $T_2$, bits 1–16 of register 40 and bits 18–33 of register 45 will be low thereby causing outputs 43 and 49 to both be low (both will thus generate a hit signal). To accommodate the threshold crossing, one clock cycle must be included in between which cycle is to preferably be ignored. Hence, the output of bit 17 need not be interrogated. At the end of the thirty-third clock cycle, output 51 will go high thereby indicating that a primary of a signal from a fixed frequency source was received. When the image or other sideband of that signal is evaluated (times $T_5$ to $T_7$), the opposite situation will occur. That is, outputs 44 and 48, but not both of outputs 43 and 49, will be low, thus causing a high on output 53. As will be appreciated from the foregoing, the circuitry of FIG. 2 may be utilized to generate an indication that a signal from a fixed frequency source has been received.

With reference to FIG. 3 II, there is shown similar exemplary waveforms produced when an FSK signal such as from a collision system transmitter is received. As seen in waveform A of FIG. 3 II, the output of filter 23 will have more than one threshold crossing between the up phase and down phase portions. More specifically, at least one such crossing will occur outside the time of single clock cycle $T_3$ or $T_6$. Hence, as seen in waveforms C and D of FIG. 3 II, there will not be a sequence like that generated by a fixed frequency signal as discussed above. Rather, during one of times $T_2$ and $T_4$ (and/or one of times $T_3$ and $T_7$), output Q of latches 37 and 38 will both be high (as seen in time $T_X$ in FIG. 3 II) thereby precluding both outputs 43 and 49 (or both outputs 44 and 48, depending upon where in the sweep the evaluation occurs) from being low throughout the relevant time. Hence, neither of gates 50 and 52 will produce a logic "1" output when the received signal is an FSK signal such as from the radar-based collision system. As is now apparent, the circuitry of FIG. 2 constructed according to the principles of the present invention may be utilized to discriminate between received signals from a fixed frequency source and from a high frequency varying source.

A further advantage of the present invention will be explained with reference to the waveforms of FIG. 3 III which are exemplary of the waveforms produced by reception of spurious homodyne receiver signals. Typically, these spurious signals are so weak that they will not cause the discriminator output to be in its up phase and down phase portions for the required time. Hence, during receipt of such spurious signals, the circuit of FIG. 2 will not generate an alarm enable signal as the outputs of gates 50 and 51 will remain low. As mentioned at the outset, however, the circuitry of the present invention was not intended to replace the pulse position technique of U.S. Pat. No. 4,583,057, but rather to augment same. Indeed, as the signal strength of a homodyne receiver spurious signal increases, the discriminator output would tend to stretch out as indicated by the arrows Y of waveform A of FIG. 3 III. Hence, such a spurious signal could, under extreme conditions, appear to meet the timing criteria of the circuit of FIG. 2 and thereby cause an alarm enable signal to be generated as though a police radar signal had been received. However, unlike signals from a fixed frequency source, reception of a spurious homodyne receiver signal was found to result in discriminator outputs that were not characteristically a primary signal followed by image signal ($T_2-T_4$ then $T_5-T_7$), but rather generated at least one image signal followed by at least one primary signal as can be seen in waveform A of FIG. 3 III. By utilizing both outputs 51 and 53, it is possible to detect the sequence of primary to image signals or vice versa to thereby discriminate against spurious homodyne receiver signals as well. Consequently, the present invention may be advantageously utilized to eliminate both spurious high frequency modulated signals and spurious homodyne receiver signals.

As will be recalled, output 51 will go high if discriminator 22 output is a primary signal whereas output 53 will go high if discriminator 22 output is an image signal. Where the invention is to be employed to discriminate between only police radar signals and collision radar signals, for example, either or both outputs 51 and 53 may be utilized to generate an alarm enable signal. However, as another aspect of the present invention, the circuitry may advantageously discriminate against spurious homodyne receiver signals as well by generating an alarm enable signal only in response to the sequence of a primary signal followed by an image signal (a high from gate 50 followed by a high from gate 52) during a sweep of oscillator 12. If the reverse sequence were to occur, no alarm, enable signal would be generated. To accomplish the foregoing, and to further utilize the primary and image signals to also indicate whether the received signal is X-band or K-band police radar, alarm enable system 55 is preferably adapted as shown schematically in FIG. 4.

Figure 4:
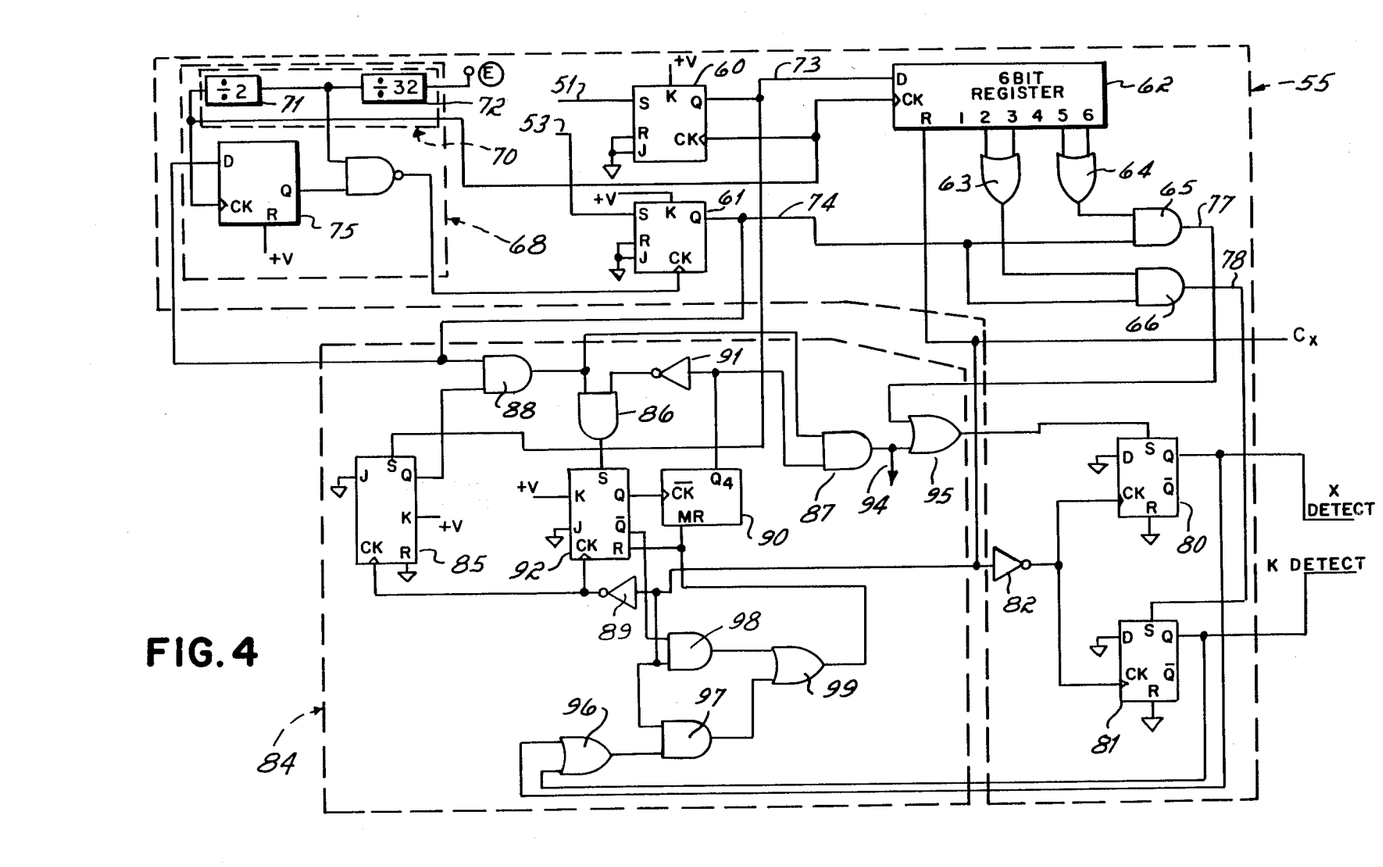
FIG. 4 is a schematic representation of the fail-safe circuitry of the present invention.

As was discussed in U.S. Pat. No. 4,313,216, the time, approximately $T_B$, between the primary and image signals may be utilized to determine whether the received signal was emitted from a transmitter operating in the X-band or the K-band. To this end, system 55 shown schematically in FIG. 4 is provided comprising J-K flip-flops or latches 60 and 61, 6-bit shift register 62, logic gates 63, 64, 65 and 66 and pulse stretcher 68. Output 51 of gate 50 is coupled to latch 60, which latch is reset every sixty-fourth clock cycle by virtue of a divide-by-64 circuit 70 comprised of the serial combination of divide-by-2 circuit 71 and divide-by-32 circuit 72. Output 73 of latch 60 will be low until output 51 goes high after which output 73 will switch to and remain high until reset as discussed above. Similarly, output 53 of gate 52 is coupled to latch 61 such that output 74 of latch 61 will be low until output 53 goes high at which time output 74 will also go high. However, output 74 will remain high for less time than output 73 due to pulse stretcher 68. Once output 74 goes high, the output of D-flip-flop or latch 75 will switch from low to high thereby enabling signals from divide-by-32 circuit 72 to be coupled to latch 61 thereby resetting same before latch 60 is reset. Latch 75 will be reset when latch 60 is reset.

As a result of the foregoing, when a signal from a fixed frequency source is detected, output 73 will go high and within one of two preset ranges of time thereafter, output 74 will produce a logic "1" pulse. At the time the pulse is generated, either of bits 2 and 3 or either of bits 5 and 6 of 6-bit shift register 62 should be high. Hence, register 62 functions as a delay line for output 73 of latch 60 (register 62 is cleared at the beginning of each sweep by the $C_X$ signal, which signal is a short high pulse at the beginning of a sweep, from clock 14). When an appropriate output of register 62 is high and output 74 is simultaneously high, the appropriate AND gates 65 or 66 will provide a logic "1" pulse to indicate detection of an X-band or a K-band police radar signal, respectively. Were the image signal to occur before the primary signal, such as in response to a strong homodyne receiver signal, the output pulse from latch 61 will not coincide with a high output from either of gates 63 and 64. Under these circumstances, no high will be generated on either of outputs 76 or 77. Hence, no alarm enable signal will be generated in response to receipt of a spurious homodyne receiver signal.

Output 77 of gate 65 may be directly coupled to the input of latch 80 and output 78 of gate 66 may be similarly coupled to the input of latch 81. Latches 80 and 81 will both typically have a low on their respective outputs Q, but one or the other will go high in response to a high output from a respective gate 65 or 66. The selected Q outputs will remain high through the remainder of the sweep of oscillator 12 but will be reset by the rising edge of the inverted $C_X$ signal (due to inverter 82) following the beginning of the next sweep. The Q outputs of latches 80 and 81 constitute the alarm enable output of system 55 and they may be utilized to drive the remaining circuitry 29 which preferably contains circuitry to generate audible and visual alarms indicative of reception of a police radar signal and the band.

As an added feature of the present invention, there is provided a fail-safe circuit 84. Fail-safe circuit 84 monitors outputs 73 and 74 for the occurrence of a primary signal followed by an image signal. When a primary signal occurs in any sweep of oscillator 12, the Q output of J-K flip-flop or latch 85, which is typically low, will switch high and remain high throughout the sweep until reset by the rising edge of the inverted $C_X$ signal from clock 14 (due to inverter 89) following the beginning of the next sweep. Once the $Q_4$ output of latch 85 is switched high, but not before, any high pulse from latch 61 indicative of an image signal will be passed to the input of AND gates 86 and 87 by AND gate 88. The $Q_4$ output of ripple counter 90 is typically low and, due to inverter 91, the other input to gate 86 will typically be high. Hence, each high pulse in output 74 occurring after a first high from latch 60 will result in a high pulse on the S input of J-K flip-flop or latch 92 thereby causing the Q output to switch from low to high. The Q output of latch 92 will also remain high until reset following the beginning of the next sweep. At that time, the high to low transition will clock counter 90 causing it to increment its count. Should four high to low transitions occur before counter 90 is reset, the $Q_4$ output of counter 90 will go high which will preclude further clocking of counter 90 (AND gate 86 will be disabled), and importantly, AND gate 87 will be enabled such that the next high pulse from gate 88 will cause a high pulse from gate 87. The output 94 of gate 87 may be utilized to turn on a panel indicator (not shown) to alert the user (not shown) that the unit is malfunctioning as will be explained below. Preferably, output 94 is OR'd by gate 95 with output 77 such that a high pulse from either will generate an X-detect output from latch 80 thereby enabling an alarm to indicate reception of a police radar signal.

To prevent inopportune operation of fail-safe circuit 84, the X-detect and K-detect outputs of latches 80 and 81 are OR'd by gate 96 to produce a high on a first input to AND gate 97 whenever a police radar signal is received and determined to be in the X- or K-band. The other input to gate 97 is typically low except at the beginning of the sweep of oscillator 12. Hence, if an X-detect or K-detect occurs before the end of a sweep, the output of gate 97 will go high as the next sweep begins and that high will be passed by OR gate 99 to latch 92 and counter 90 thereby resetting both. Hence, under normal operation, counter 90 will not have a high on its $Q_4$ output. However, should the clock begin to slow, for example, the timing relationship as expected by system 55 may no longer hold true. Hence, a primary signal may be followed by an image signal yet no alarm will be generated. Should this situation occur in repeated sweeps of oscillator 12, circuit 84 will operate as described to generate a signal on output 94 which may be used to advise of a malfunction and/or to override circuit 55 and couple a high pulse to latch 80 to thereby enable an alarm anyway.

Additionally, until the outputs from gates 50 and 52 generate a primary signal followed by an image signal during any sweep, the Q output of latch 92 will be high. Hence, if no such sequence occurs during a sweep, the $C_X$ signal from clock 14 (which signal is high only at the beginning of a sweep) will be passed to gate 99 by AND gate 98 thereby resetting latch 92 and counter 90. Hence, if any full sweep occurs without detection of a signal to generate a primary followed by an image, counter 90 will be reset thus maintaining its $Q_4$ output at a logic "0". Should a police radar signal be received, the Q output of latch 92 will go low thus preventing the reset of latch 92 by clock signal $C_X$ until after counter 90 has been clocked to increase its count. Thus, if a primary signal is followed by an image signal during five consecutive sweeps without generation of an X-detect or K-detect signal, fail-safe circuit 84 will cause generation of an alarm.

The integrated circuits utilized in spurious signal discriminator circuit 28 are preferably CMOS digital semiconductors available, for example, from Signetics, Inc. of Sunnyvale, Calif. J-K flip-flops 37,38,60,61,85,92 are preferably part number 4027; D-flip-flop 75 is preferably part number 4174; and counter 90 is preferably part number 4024.

Radar warning receiver 5 is conventionally powered by the battery of a vehicle (both not shown) through a regulated power supply 30 to provide a source of positive voltage +V. Supply 30 may be on-board the chassis with receiver 5 or in a plug (not shown) adapted to be received within a vehicle's cigarette lighter socket (not shown) as described in Grimsley, U.S. patent application, Ser. No. 656,157, filed Sept. 28, 1984, entitled "Polic Radar Warning Receiver with Power Plug" and assigned to the assignee herein. The disclosure of said U.S. patent application, Ser. No. 656,157 is incorporated herein by reference.

By virtue of the foregoing, there is provided a circuit which can discriminate between pulsed or continuous signals from a fixed frequency source and such signals from a variable frequency source. Additional advantages and modifications will readily appear to those skilled in the art. The present invention in its broader aspects is therefore not limited to the preferred embodiment and illustrated examples shown and described. Accordingly, departures may be made from such details without departing from the spirit or scope of the present invention.

Having described the invention, what I claim is:

1. A receiver adapted to distinguish between pulsed and continuous signals from a fixed frequency source and pulsed and continuous signals from a variable frequency source, the receiver comprising:

oscillator means for generating an oscillator signal which is swept in frequency between a first frequency and a second frequency;

mixer means for mixing said oscillator signal with received pulsed and continuous signals to provide IF signals;

discriminator means which is responsive to said IF signals for generating output signals having a voltage level which varies relative to a threshold voltage;

first circuit means which is responsive to said output signals for providing evaluation signals which are alternatively in either a first state or a second state at a given time, said state being indicative of the voltage level of said output signal relative said threshold voltage at said given time; and second circuit means which is responsive to said evaluation signals for indicating that the received signals are from a fixed frequency source when said evaluation signals are in only said first state throughout a first predetermined time interval and are in only said second state throughout a third predetermined time interval, said third time interval begining a second predetermined time interval after said first time interval ends.

2. A receiver adapted to distinguish between pulsed and continuous signals from a fixed frequency source and pulsed and continuous signals from a variable frequency source, the receiver comprising:

oscillator means for generating an oscilllator signal which is swept in frequency between a first frequency and a second frequency;

mixing means for mixing said oscillator signal with received pulsed and continuous signals to provide IF signals;

discriminator means being responsive to said IF signals for generating output signals having a voltage level which varies relative to a threshold voltage;

first circuit means which is responsive to said output signals for providing evaluation signals which are alternatively in either of a first state or a second state at a given time, said state being indicative of the voltage level of said output signal relative said threshold voltage at said given time;

second circuit means which is responsive to said evaluation signals for generating a first status signals when said evaluation signals are in only said first state throughout a time interval and a second status signal when said evaluation signals are in only said second state throughout said time interval;

third circuit means for indicating that the received signals are from a fixed frequency source when said first status signal is generated throughout a first consecutive number of said time intervals and said second status signal is generated throughout a third consecutive number of said time intervals, said third consecutive number of said time intervals begining a second consecutive number of said time intervals after said first consecutive number of said time intervals ends.

3. The receiver of clam 2, said second circuit means comprising:

first latch means which is responsive to said evaluation signals for generating a first latch signal which is in a third state if said evaluation signals are in said first state during any portion of said time interval and which is in a fourth state if said evaluation signals are in only said second state throughout said time interval;

second latch means which is responsive to said evaluation signals for generating a second latch signal which is in a fifth state if said evaluation signals are in said second state during any portion of said time interval and which is in a sixth state if said evaluation signals are in only said first state throughout said time interval;

a said first status signal being generated when said first latch signal is in said third state while said second latch signal is in said sixth state, a said second status signal being generated when said first latch signal is in said fourth state while said second latch signal is in said fifth state.

4. The receiver of claim 3, said second consecutive number being one.

5. The receiver of claim 4, said first consecutive number being equal to said third consecutive number.

6. The receiver of claim 3, said first consecutive number being equal to said third consecutive number.

7. The receiver of claim 2, said second consecutive number being one.

8. The receiver of claim 7, said forst consecutive number being equal to said third consecutive number.

9. The receiver of claim 2, said first consecutive number being equal to said third consecutive number.

10. A receiver adapted to distinguish between pulsed and continuous signals from a fixed frequency source and pulsed and continuous signals from a variable frequency source, the receiver comprising:

oscillator means for generating an oscillator signal which is swept in frequency between a first frequency and a second frequency;

mixer means for mixing said oscillator signal with received pulsed and continuous signals to provide IF signals;

discriminator means being responsive to said IF signals for generating output signals having a voltage level which varies relative to a threshold voltage;

first circuit means which is responsive to said output signals for providing evaluation signals which are alternatively in either a first state or a second state at a given time, said state being indicative of the voltage level of said output signal relastive said threshold voltage at said given time;

first latch means which is responsive to said evaluation signals for generating a first latch signal which is in a third state if said evaluation signals are in said first state during any portion of a time interval and which is in a fourth state if said evaluation signals are in said second state throughout said time interval;

second latch means which is responsive to said evluation signals for generating a second latch signal which is in a fifth state if said evaluation signals are in said second state during any portion of said time interval and which is in a sixth state if said evaluation signals are in said first state throughout said time interval;

first shift register means which is responsive to said first latch signal for sequentially storing said state of said first latch signal during a first consecutive number of said time intervals;

second shift register means which is responsive to said second latch signal for sequentially storing said state of said second latch signal during a second consecutive number of said time intervals, said second consecutive number of said time intervals beginning a third consecutive number of said time intervals after said first consecutive number of said time intervals ends;

said first shift register means generating a first hit signal if each said stored first latch signal state is in said fourth state;

said second shift register means generrting a second hit signal if each said stored second latch signal state is in said sixth state;

second circuit means which is responsive to said hit signals for indicating that the received signals are from a frequency source when said first hit signal and said second hit signal are both generated as said oscillator signal is swept in frequency between said first and second frequencies.

11. The receiver of claim 10, said second consecutive number being one.

12. The receiver of claim 11, said first consecutive number being equal to said third consecutive number.

13. The receiver of claim 10, said first consecutive number being equal to said third consecutive number.

14. A receiver adapted to distinguish between pulsed and continuous signals from a fixed frequency source and pulsed and continuous signals from a variable frequency source, the receiver comprising:

oscillator means for generating an oscillator signal which is swept in frequency between a first frequency and a second frequency;

mixer means for mixing said oscillator signal with received pulsed and continuous signals to provide IF signals;

discriminator means being responsive to said IF signals for generating output signals having a voltage level which varies relative to a threshold voltage;

first circuit means which is responsive to said output signals for providing evaluation signals which are alternatively in either a first state or a second state at a given time, said state being indicative of the voltage level of said output signal relative said threshold voltage at said given time;

second circuit means which is responsive to said evaluation signals for generating a first status signal when said evaluation signals are in only said first state throughout a time interval and a second status signal when said evaluation signals are in only said second state throughout said time interval;

third circuit means which is responsive to said status signals for generating a primary signal and an image signal, said primary signal being generated when said first status signal is generated throughout a first consecutive number of said time intervals and said second status signal is generated throughout a third consecutive number of said time intervals, said third consecutive number of said time intervals beginning a second consecutive number of said time intervals after said first consecutive number of said time intervals ends, said image signal being generated when said second status signal is generated throughout said first consecutive number of said time intervals and said first status signal is generated throughout said third consecutive number of said time intervals, at least one of said primary signal and said image signal being indicative that the received signals are from a fixed frequency source.

15. The receiver of claim 14 further comprising:

fourth circuit means which is responsive to said third circuit means for indicating that the received signals are from a fixed frequency source only if said primary signal is generated before said image signal is generated as said oscillator signal is swept in frequency between said first frequency and said second frequency.

16. The receiver of claim 15, said fourth circuit means indicating that the received signals are from a fixed frequency source only if said image signal is generated within a preselected range of time after said primary signal is generated.

17. The receiver of claim 16 further comprising:

fail-safe means which is responsive to said third circuit means for indicating that the received signals are from a fixed frequency source when said primary signal is generated before said image signal is generated but outside said preselected range of time during each of a predetermined number of sweeps in frequency of said oscillator signal between said first and second frequencies.

18. The receiver of claim 15 further, comprising:

fail-safe means which is responsive to said third circuit means for indicating a probable malfunction in the receiver when said primary signal is generated before said image signal is generated and said fourth circuit means does not indicate that the received signals are from a fixed frequency source as said oscillator signal is swept in frequency between said first and second frequencies.

19. The receiver of claim 16, further comprising:
fail-safe means which is responsive to said third circuit means for indicating a probable malfunction in the receiver when said primary signal is generated before said image signal is generated but outside said preselected range of time and said fourth circuit means does not indicate that the received signals are from a fixed frequency source as said oscillator signal is swept in frequency between said first and second frequencies.

20. A method of discriminating between signals from a fixed frequency source and signals from a variable frequency source, comprising:
mixing a received signal with an oscillator signal which is swept in frequncy between a first frequency and a second frequency to produce IF signals;
generating output signals responsive to said IF signals and having a voltage level that varies relative to a threshold voltage;
generating evaluation signals which are alternatively in either a first or a second state at any given time, said state being indicative of the voltage level of said output signal relative said threshold voltage at said given time; and
generating an indicator that the received signal is from a fixed frequency source only when said evaluation signals are in only said first state throughout a first predetermined time interval and are in only said second state throughout a third predetermined time interval, said third time interval beginning a second predetermined time interval after said first time interval ends.

21. A method of discriminating between signals from a fixed frequency source and signals from a variable frequency source, comprising:
mixing a received signal with an oscillator signal which is swept in frequency between a first frequency and a second freqeuncy to produce IF signals;
generating output signals responsive to said IF signals and having a voltage level that varies relative to a threshold voltage;
generating evaluation signals which are alternatively in either a first or a second state at a given time, said state being indicative of the voltage level of said output signal relative said threshold voltage at said given time; and
generating a first status signal when said evaluation signals are in only said first state throughout a time interval;
generating a second status signal when said evaluation signals are in only said second state throughout said time interval;
generating an indicator that the received signal is from a fixed frequency source only when said first status signal is generated throughout a first consecutive number of said time intervals and said second status signal is generated throughout a third consecutive number of ssaid time intervals, said third consecutive number of said time intervals beginning a second consecutive number of said time intervals after said first consecutive number of time intervals ends.

22. The method of claim 21 further comprising:
generating a first latch signal which is in a third state if said evaluation signals are in said first state during any portion of said time interval and which is in a fourth state if said evaluation signals are in only said second state throughout said time interval;
generating a second latch signal which is in a fifth state if said evaluation signals are in said second state during any portion of said time interval and which is in a sixth state if said evaluation signals are in only said first state throughout said time interval;
generating a said first status signal when said first latch signal is in said third state while said second latch signal is in said fifth state;
generating a said second status signal when said first latch signal is in said fourth state while said second latch signal is in said fifth state.

23. A method of discriminating between signals from a fixed frequency source and signals from a variable frequency source, comprising:
mixing a received signal with an oscillator signal which is swept in frequency between a first frequency and a second frequency to produce IF signals;
generating output signals responsive to said IF signals and having a voltage level that varies relative to a threshold voltage;
generating evaluation signals which are alternatively in either a first state or a second state at a given time, said state being indicative of the voltage level of said output signal relative said threshold voltage at said given time;
generating a first latch signal which is in a third state if said evaluation signals are in said first state during any portion of said time interval and which is in a fourth state if said evaluation signals are in only said second state throughout said time interval;
generating a second latch signal which is in a fifth state if said evaluation signals are in said second state during any portion of said time interval and which is in a sixth state if said evaluation signals are in only said first state throughout said time interval;
sequentially storing said state of said first latch signal during a first consecutive number of said time intervals;
sequentially storing said state of said second latch signal during a second consecutive number of said time intervals, said second consecutive number of said time intervals beginning a third consecutive number of said time intervals after said first consecutive number of said time intervals ends;
generating a first hit signal if each said stored first latch signal state is in said fourth state;
generating a second hit signal if each said stored second latch signal state is in said sixth state;
generating an indicator that the received signal is from a fixed frequency source when said first hit signal and said second hit signal are both generated as said oscillator signal is swept in frequency between said first and second frequencies.

24. A method of discriminating between signals from a fixed frequency source and signals from a variable frequency source, comprising:
mixing a received signal with an oscillator signal which is swept in frequency between a first frequency and a second frequency to produce IF signals;
generating output signal sresponsive to said IF signals and having a voltage level that varies relative to a threshold voltage;
generating evaluations ignals which are alternatively in either a first state or a second state at a given time, said state being indicative of the voltage level of said output signal relative said threshold voltage at said given time;

generating a first status signal when said evaluation signals are in only said first state throughout a time interval;

generating a second status signal when said evaluation signals are in only said second state throughout said time interval;

generating a primary signal when said first status signal is generated throughout a first consecutive number of said time intervals and said second status signal is generated throughout a third consecutive number of said time intervals, said third consecutive number of said time intervals beginning a second consecutive number of time intervals after said first consecutive number of time intervals ends;

generating an image signal when said second status signal is generated throughout said first consecutive number of said time intervals and said first status signal is generated throughout said third consecutive number of said time intervals;

generating an indicator that the received signal is from a fixed frequency source in response to generation of at least one of said primary signal and said image signal.

25. The method of claim 24 further comprising generating said indicator only in response to said primary signal being generated before said image signal is generated as said oscillator signal is swept in frequency between said first frequency and said second frequency.

26. The method of claim 25 wherein said indicator is generated only if said image signal is generated within a preselected range of time after said primary signal is generated.

27. The method of claim 26 further comprising generating a further indicator that the received signal is from a fixed frequency source when said primary signal is generated before said image signal is generated but outside said preselected range of time during each of a predetermined number of sweeps in frequency of said oscillator signal between said first and second frequencies.

28. The method of claim 25 further comprising generating a second indicator of a probable malfunction when said primary signal is generated before said image signal is generated and said first indicator is not generated as said oscillator signal is swept in frequency between said first and second frequencies.

29. The method of claim 26 further comprising generating a second indicator of a probable malfunction when said primary signal is generated before said image signal is generated but outside said preselected range of time and said first indicator is not generated as said oscillator signal is swept in frequency between said first and second frequencies.

30. The receiver of claim 1 further comprising:
second oscillator means for generating a second oscillator signal at a predetermined frequency;
said mixer means including:
first LO mixer means for mixing said oscillator signal generated by one of said oscillator means with received pulse and continuous signals to provide first mixed signals; and
second LO mixer means for mixing said oscillator signal generated by another of said oscillator means with said first mixed signals to provide said IF signals.

31. The receiver of claim 2 further comprising:
second oscillator means for generating a second oscillator signal at a predetermined frequency;
said mixer means including:
first LO mixer means for mixing said oscillator signal generated by one of said oscillator means with received pulse and continuous signals to provide first mixed signals; and
second LO mixer means for mixing said oscillator signal generated by another of said oscillator means with said first mixed signals to provide said IF signals.

32. The receiver of claim 10 further comprising:
second oscillator means for generating a second oscillator signal at a predetermined frequency;
said mixer means including:
first LO mixer means for mixing said oscillator signal generated by one of said oscillator means with received pulse and continuous signals to provide first mixed signals; and
second LO mixer means for mixing said oscillator signal generated by another of sid oscillator means with said first mixed signals to provide said IF signals.

33. The receiver of claim 14 further comprising:
second oscillator means for generating a second oscillator signal at a predetermined frequency;
said mixer means including:
first LO mixer means for mixing said oscillator signal generated by one of said oscillator means with received pulse and continuous signals to provide first mixed signals; and
second LO mixer means for mixing said oscillator signal generated by said oscillator means with said first mixed signals to provide said IF signals.

34. A receiver adapted to distinguish between pulsed and continuous signals from a fixed frequency source and pulsed and continuous signals from a variable frequency source, the receiver comprising:
means for generating a first signal which is varied in frequency between a first frequency and a second frequency;
means for mixing said first signal with received pulsed and continuous signals to provide first output signals;
means responsive to said first output signals for providing second output signals having a level which varies relative to a threshold level;
means which is responsive to said second output signals for indicating that the received signals are from a fixed frequency source only when said second output signals have a first relationship to said threshold level throughout a first time interval and said second output signals have a second relationship to said threshold level throughout a second time interval, said second time interval beginning a third time interval after said first time interval ends.

35. The receiver of claim 34, said first relationship being that said level is greater than said threshold level, said second relationship being that said level is less than said threshold level.

36. The receiver of claim 34, said first relationship being that said level is less than said threshold level, said second relationship being that said level is greater than said threshold level.

37. A method of discrimianting between signals from a fixed frequency source and signals from a variable frequency source, comprising:

mixing a received signal with a first signal which is varied in frequency between a first frequency and a second frequency to produce first output signals;

generating second output signals responsive to said first output signals and having a level that varies relative to a threshold level;

generating an indicator that the received signal is from a fixed frequency source only when the level of said second output signal has a first relationship to said threshold level throughout a first time interval and the level of said second output signal has a second relationship to said threshold level throughout a second time interval, said second time interval beginning a third time interval ater said first time interval ends.

38. The method of claim 37, said first relationship being that said level is greater than said threshold level, said second relationship being that said level is less than said threshold level.

39. The method of claim 37, said first relationship being that said level is less than said threshold level, said second relationship being that said level is greater than said threshold level.

40. In a police radar warning receiver, apparatus adapted to provide an alarm in response to fixed frequency continuous and pulsed signals in a police radar band and not in response to frequency shift keyed continuous and pulsed signals in the police radar band, comprising:

antenna means for receiving fixed frequency and frequency shift keyed continuous and pulsed signals in the police radar band;

circuit means responsive to said antenna means for generating a control signal in response to receipt of each signal in the police radar band, said control signal being of a first type in response to receipt of a fixed frequency signal in the police radar band, said control signal being of a second type in response to receipt of a frequency shift keyed signal in the police radar band; and control means responsive to said signal means for enabling an alarm in response to said control signal such that said alarm is enabled only in response to said control signal being of said first type whereby said alarm will not be enabled in response to said control signal being of said second type so as to enable said alarm only in response to fixed frequency signals in the police radar band and not in response to frequency shift keyed continuous and pulsed signals therein.

41. A method of operating a police radar warning receiver to eliminate false alarms in response to receipt of frequency shift keyed signals in a police radar band comprising:

receiving fixed frequency and frequency shift keyed continuous and pulsed signals in the police radar band;

generating a control signal being one of a first type and a second type in response to receipt of each signal in the police radar band, said control signal being of said first type in response to receipt of a fixed frequency signal in the police radar band, said control signal being of said second type in response to receipt of a frequency shift keyed signal in the police radar band; and enabling an alarm in response to said control signal such that said alarm is enabled only in response to said control signal being of said first type whereby said alarm will not be enabled in response to said control signal being of said second type so as not to enable said alarm in response to receipt of frequency shift keyed continuous and pulsed signals in the police radar band.

* * * * *

UNITED STATES PATENT AND TRADEMARK OFFICE
CERTIFICATE OF CORRECTION

PATENT NO. : 4,750,215
DATED : June 7, 1988
INVENTOR(S) : Michael A. Biggs

It is certified that error appears in the above-identified patent and that said Letters Patent is hereby corrected as shown below:

Column 13, line 16, "Polic" should be -- Police -- .

Column 13, line 60, "begining" should be -- beginning -- .

Column 14, line 14, the second "signals" should be -- signal -- .

Column 14, line 24, "consective" should be -- consecutive -- .

Column 14, line 30, "clam" should be -- claim -- .

Column 14, line 61, "forst" should be -- first -- .

Column 15, line 14, "relastive" should be -- relative -- .

Column 15, line 46, "generting" should be -- generating -- .

Column 17, line 60, "ssaid" should be -- said -- .

Column 18, line 64, "sresponsive" should be -- responsive -- .

Column 18, line 67, "evaluations ignals" should be -- evaluation signals -- .

Column 20, line 22, "sid" should be -- said -- .

UNITED STATES PATENT AND TRADEMARK OFFICE
CERTIFICATE OF CORRECTION

PATENT NO. : 4,750,215

DATED : June 7, 1988

INVENTOR(S) : Michael A. Biggs

It is certified that error appears in the above-identified patent and that said Letters Patent is hereby corrected as shown below:

Column 20, line 66, "discrimianting" should be --discriminating--.

Signed and Sealed this

Seventh Day of March, 1989

Attest:

DONALD J. QUIGG

Attesting Officer

Commissioner of Patents and Trademarks